(12) United States Patent
Kuwahara et al.

(10) Patent No.: US 9,903,470 B2
(45) Date of Patent: Feb. 27, 2018

(54) CONTROL SYSTEM FOR TRANSMISSION

(71) Applicant: Toyota Jidosha Kabushiki Kaisha, Toyota-shi (JP)

(72) Inventors: Seiji Kuwahara, Susono (JP); Hirotsugu Yoshino, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 219 days.

(21) Appl. No.: 15/050,531

(22) Filed: Feb. 23, 2016

(65) Prior Publication Data

US 2016/0258529 A1 Sep. 8, 2016

(30) Foreign Application Priority Data

Mar. 2, 2015 (JP) ................................. 2015-040136

(51) Int. Cl.
*B60W 10/02* (2006.01)
*B60W 30/19* (2012.01)
(Continued)

(52) U.S. Cl.
CPC ......... *F16H 61/04* (2013.01); *F16H 61/0204* (2013.01); *F16H 61/0437* (2013.01); *F16H 2061/0474* (2013.01); *F16H 2200/006* (2013.01); *F16H 2200/0086* (2013.01); *F16H 2200/2007* (2013.01);
(Continued)

(58) Field of Classification Search
CPC .............................. B60W 10/02; B60W 30/19
See application file for complete search history.

(56) References Cited

U.S. PATENT DOCUMENTS 5,588,327 A * 12/1996 Downs .................. F16H 61/061
192/48.601
7,300,381 B2 11/2007 Badillo et al.
(Continued)

FOREIGN PATENT DOCUMENTS

JP 2003-159967 A 6/2003
JP 2010-38221 A 2/2010
(Continued)

*Primary Examiner* — Tisha D Lewis
(74) *Attorney, Agent, or Firm* — Oblon, McClelland, Maier & Neustadt, L.L.P.

(57) ABSTRACT

A control system for a transmission includes first and second engagement devices and a controller. The first engagement device brings first dog teeth of a first member into engagement with second dog teeth of a second member to enable torque transmission therebetween. The second engagement device connects a third member and a fourth member while changing a torque transmitting capacity therebetween. The transmission establishes a predetermined gear stage by bringing into engagement the first engagement device and the second engagement device. The controller is configured to bring the first engagement device into engagement while reducing a torque transmitting capacity of the second engagement device and then to increase the torque transmitting capacity of the second engagement device, when shifting a gear stage from another gear stage established by bringing the first engagement device into disengagement while bringing the second engagement device into engagement to said predetermined gear stage.

7 Claims, 7 Drawing Sheets

(51) Int. Cl.
*F16H 61/04* (2006.01)
*F16H 61/02* (2006.01)

(52) U.S. Cl.
CPC ............... *F16H 2200/2046* (2013.01); *F16H 2200/2064* (2013.01); *F16H 2200/2094* (2013.01); *F16H 2200/2097* (2013.01)

(56) References Cited

U.S. PATENT DOCUMENTS

| | | | |
|---|---|---|---|
| 2002/0053248 | A1 | 5/2002 | Yamamoto |
| 2010/0261577 | A1* | 10/2010 | MacFarlane ............ F16D 48/06 477/84 |
| 2011/0307150 | A1* | 12/2011 | Jiang .................... B60W 10/113 701/54 |
| 2013/0228027 | A1 | 9/2013 | Ikeya et al. |
| 2014/0051543 | A1 | 2/2014 | Dourra et al. |
| 2014/0144744 | A1 | 5/2014 | Hirawaki |
| 2015/0198242 | A1* | 7/2015 | Knox ..................... F16H 61/14 477/64 |
| 2017/0314672 | A1* | 11/2017 | Inoue ................. F16H 61/0403 |

FOREIGN PATENT DOCUMENTS

| | | |
|---|---|---|
| JP | 2013-151997 A | 8/2013 |
| JP | 2014-105845 A | 6/2014 |
| JP | 2014-173634 A | 9/2014 |

\* cited by examiner

| Gear Stage | C1 | C2 | C3 | C4 | B1 | B2 |
|---|---|---|---|---|---|---|
| 1st | O | – | – | – | – | O |
| 2nd | O | – | – | – | O | – |
| 3rd | O | – | O | – | – | – |
| 4th | O | – | – | O | – | – |
| 5th | O | O | – | – | – | – |
| 6th | – | O | – | O | – | – |
| 7th | – | O | O | – | – | – |
| 8th | – | O | – | – | O | – |
| Revs1 | – | – | O | – | – | O |
| Revs2 | – | – | – | O | – | O |

O : Engagement
– : Disengagement

CONTROL SYSTEM FOR TRANSMISSION

CROSS-REFERENCE TO RELATED APPLICATIONS

The present application claims the benefit of priority to Japanese Patent Application No. 2015-040136 filed on Mar. 2, 2015 with the Japanese Patent Office, the entire contents of which are incorporated herein by reference in entirety.

BACKGROUND

Field of the Invention

The present application relates to the art of a control system for a transmission adapted to establish a predetermined gear stage by bringing into engagement a first engagement device for transmitting torque and a second transmission whose torque transmitting capacity is variable.

Discussion of the Related Art

JP-A-2013-151997 describes a transmission having three frictional clutches and three dog clutches. A gear stage of the transmission taught by JP-A-2013-151997 can be shifted among first to eighth forward stages and a reverse stage by selectively bringing into engagement three clutches. However, the dog clutch has to be brought into engagement while synchronizing rotational speeds between an input member and an output member, and this may slow the response of shifting operation of the gear stage. According to the teachings of JP-A-2013-151997, therefore, a common dog clutch is brought into engagement to establish gear stages next to each other to reduce opportunities of speed synchronization.

JP-A-2014-105845 describes a claw clutch in which engagement teeth of rotary members are brought into engagement by pushing one of the rotary members. According to the teachings of JP-A-2014-105845, those engagement teeth of rotary members may be engaged with each other even if the rotational speeds of the rotary members are not in complete synchronization. To this end, in the claw clutch, each engagement tooth has a chamfered leading end.

In the transmission taught by JP-A-2013-151997, response of the shifting operation of the gear stage may be improved by applying the chamfered leading end of the engaging tooth taught by JP-A-2014-105845. In this case, however, friction between the teeth being engaged to each other will be increased during engagement if rotational speeds of the rotary members are not in synchronization. In addition, torque transmitting capacity of the dog clutch cannot be changed gradually, and hence rotational speed of one of the rotary members would be changed abruptly to cause an engagement shock when bringing into engagement the teeth of the rotary members rotating at different speeds.

SUMMARY OF THE INVENTION

Aspects of the present application have been conceived noting the foregoing technical problems, and it is therefore an object of the present application is to provide a control system for a transmission configured to allow engagement between dog teeth of rotary members rotating at different speeds without causing engagement shock.

In a non-limiting embodiment, the control system according to the present application is applied to a transmission including a first engagement device that brings first dog teeth of a first member into engagement with second dog teeth of a second member to enable torque transmission therebetween, and a second engagement device that connects a third member and a fourth member while changing a torque transmitting capacity therebetween. The transmission to which the control system is applied establishes a predetermined gear stage by bringing into engagement the first engagement device and the second engagement device. In order to achieve the above-explained objective, the control system according to the present application is provided with a controller that is configured to bring the first engagement device into engagement while reducing a torque transmitting capacity of the second engagement device and then to increase the torque transmitting capacity of the second engagement device, when shifting a gear stage from another gear stage established by bringing the first engagement device into disengagement while bringing the second engagement device into engagement to the predetermined gear stage.

In a non-limiting embodiment, the controller is configured to reduce the torque transmitting capacity of the second engagement device to a predetermined level at which a relative rotation between the third member and the fourth member is achieved when shifting the gear stage from the another gear stage to the predetermined gear stage.

In a non-limiting embodiment, the controller is configured to bring the first dog teeth into engagement with the second dog teeth after reducing the torque transmitting capacity of the second engagement device to the predetermined level.

In a non-limiting embodiment, the controller is configured to gradually increase the torque transmitting capacity of the second engagement device after bringing the first engagement device into engagement.

In a non-limiting embodiment, leading ends of at least one of the first dog teeth and the second dog teeth are chamfered so that the first member rotates in a direction to be engaged smoothly with the second member when the second dog teeth come into contact with the first dog teeth in an initial phase of engagement.

In a non-limiting embodiment, a gear ratio of the predetermined gear stage is set to be larger than that of the another gear stage. In this case, the controller shifts the gear stage from the another gear stage to the predetermined gear stage when an input speed of the transmission is reduced.

Alternatively, in a non-limiting embodiment, a gear ratio of the predetermined gear stage is set to be smaller than that of the another gear stage. In this case, the controller shifts the gear stage from the another gear stage to the predetermined gear stage when an input speed of the transmission is increased.

Thus, in the transmission to which the control system of the present application is applied, the aforementioned predetermined gear stage is established by bringing into engagement the first engagement device and the second engagement device, and the aforementioned another gear stage is established by bringing the first engagement device into disengagement while bringing the second engagement device into engagement. That is, the second engagement device is brought into engagement in both cases of establishing the predetermined gear stage and the another gear stage. According to the present application, the control system is configured to temporarily reduce the torque transmitting capacity of the second engagement device during bringing the first engagement device into engagement to shift the gear stage from the predetermined gear stage to the another gear stage. Consequently, the transmission is brought into a neutral state during bringing the first engagement device, as a dog clutch, into engagement. For this reason, an output torque of the transmission is not fluctuated by a change in a rotational speed of rotary members of the engagement devices resulting from engagement of the dog teeth. That is, a shift shock can be reduced when shifting the gear stage of the transmission.

BRIEF DESCRIPTION OF THE DRAWINGS

Features, aspects, and advantages of exemplary embodiments of the present application will become better understood with reference to the following description and accompanying drawings, which should not limit this disclosure in any way.

DETAILED DESCRIPTION OF THE ILLUSTRATIVE EMBODIMENT(S)

Figure 4:
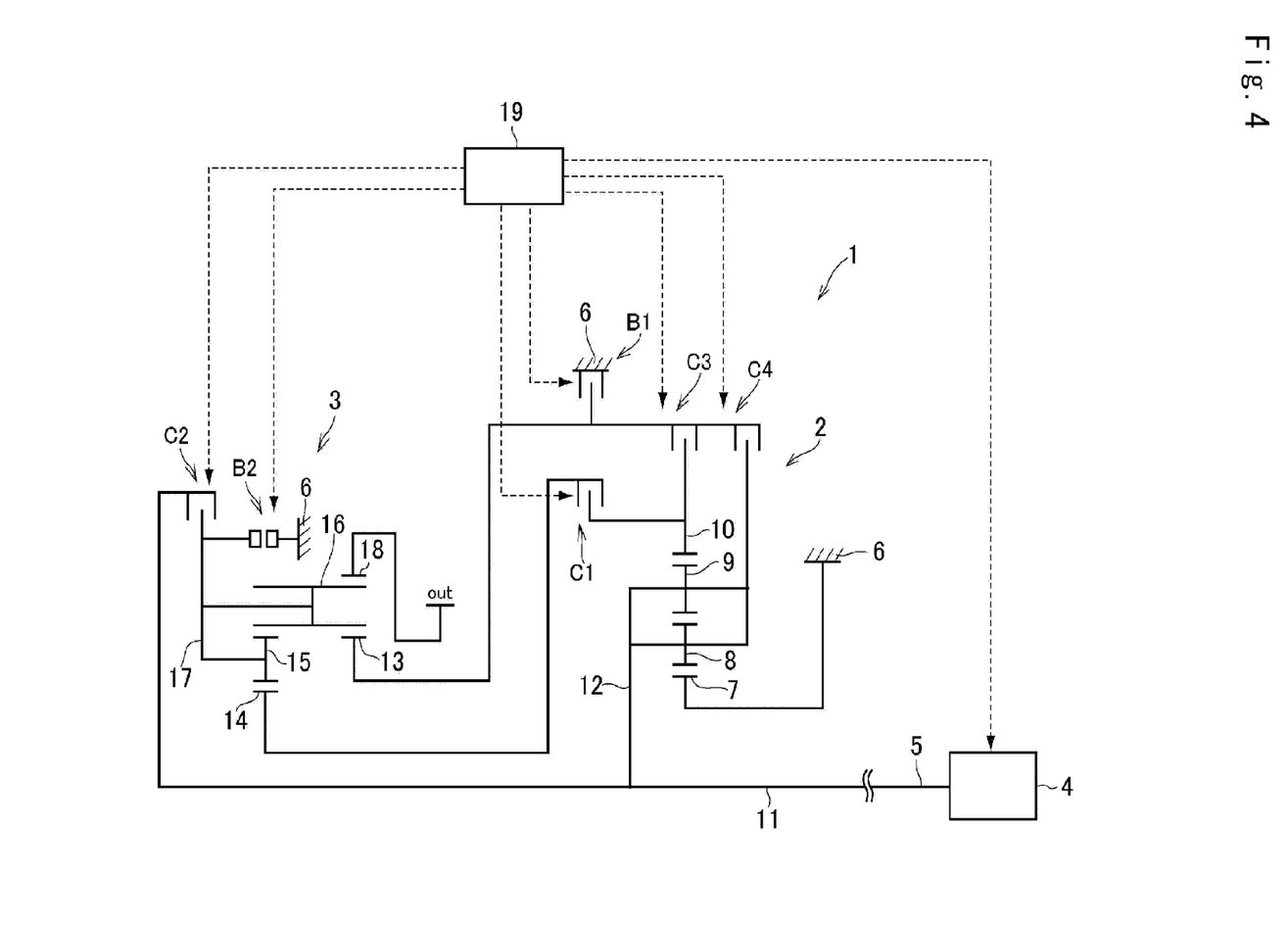
FIG. 4 is a skeleton diagram showing one example of the transmission to which the control system of the present application is applied.

Referring now to FIG. 4, there is shown one example of a transmission 1 to which the control system according to the present application is applied. The transmission 1 is formed by combining a double pinion planetary gear unit (as will be called the "first planetary gear unit") 2 with a Ravigneaux planetary gear unit (as will be called the "second planetary gear unit") 3, and connected to an output shaft 5 of an engine 4 as a prime mover of the vehicle through a torque converter. In the transmission 1, a gear stage can be selected from first to eighth forward stages and first and second reverse stages depending on a target speed of the engine 4 and a required driving force.

Specifically, the first planetary gear unit 2 is a differential mechanism comprising: a first sun gear 7 connected to a stationary member 6 such as a housing; first inner pinion gears 8 individually meshing with the first sun gear 7; first outer pinion gears 9 individually meshing with each first inner pinion gear 8; a first ring gear 10 meshing with the first outer pinion gears 9; and a first carrier 12 connected to an input shaft 11 while supporting the first inner pinion gears 8 and the first outer pinion gears 9 in a rotatable and revolvable manner. That is, the first carrier 12 serves as an input element, the first sun gear 7 serves as a reaction element, and the first ring gear 10 serves as an output element when the vehicle is powered by the engine 4. Since the first sun gear 7 is connected to the stationary member 6, the first planetary gear unit 2 may serve as a speed reducing device.

On the other hand, the second planetary gear unit 3 is also a differential mechanism comprising: a second sun gear 13 and a third sun gear 14 arranged concentrically with the input shaft 11; second inner pinion gears 15 individually meshing with the third sun gear 14; second outer pinion gears 16 individually meshing with each second inner pinion gear 15 and the second sun gear 13; a second carrier 17 supporting the second inner pinion gears 15 and the second outer pinion gears 16 in a rotatable and revolvable manner and a second ring gear 18 meshing with the second outer pinion gears 16.

The transmission 1 is provided with a plurality of clutches for selectively connecting the rotary elements of the first and the second planetary gear units 2 and 3, and a plurality of brakes for selectively stopping rotations of predetermined rotary elements. In the transmission 1, specifically, a first clutch C1 is arranged to connect the first ring gear 10 to the third sun gear 14, a second clutch C2 is arranged to connect the second carrier 17 to the input shaft 11 or the first carrier 12, a third clutch C3 is arranged to connect the first ring gear 10 to the second sun gear 13, and a clutch C4 is arranged to connect the first carrier 12 to the second sun gear 13. A conventional friction clutch is individually used as the clutches C1, C2, C3, and C4, and a torque transmitting capacity of those clutches can be varied hydraulically by a hydraulic actuator.

In addition, in the transmission 1, a first brake B1 is arranged to halt rotation of the second sun gear 13 by connecting the second sun gear 13 to the stationary member 6, and a second brake B2 is arranged to halt rotation of the second carrier 17 by connecting the second carrier 17 to the stationary member 6. The first brake B1 is also a conventional friction clutch, and a braking force thereof applied to the second sun gear 13 can be controlled by changing a torque transmitting capacity thereof by a hydraulic actuator. By contrast, the second brake B2 is adapted to halt rotation of the second carrier 17 by connecting the second carrier 17 to the stationary member 6 through dog teeth, such as those described below. Alternatively, the torque transmitting capacity of each clutch C1, C2, C3, and C4, and of the first brake B1 and the second brake B2 may also be controlled by an electromagnetic actuator.

In order to control the engine 4 and the engagement devices, the control system according to a non-limiting illustrative example is provided with an electronic control unit (abbreviated as "ECU" hereinafter) 19 serving as a "controller". The ECU 19 is comprised mainly of a microcomputer configured to carry out various kinds of calculations based on incident signals from sensors and preinstalled maps and formulas, and to transmit calculation results to the engine 4 and the engagement devices in the form of command signal. For example, the ECU 19 is configured to determine a gear stage with reference to a preinstalled speed change map for determining a gear stage based on detection signals transmitted from a vehicle speed sensor and an accelerator opening sensor, and to send command signals for establishing the determined gear stage to the clutches C1, C2, C3, and C4, and brakes B1 and B2.

Figure 5:
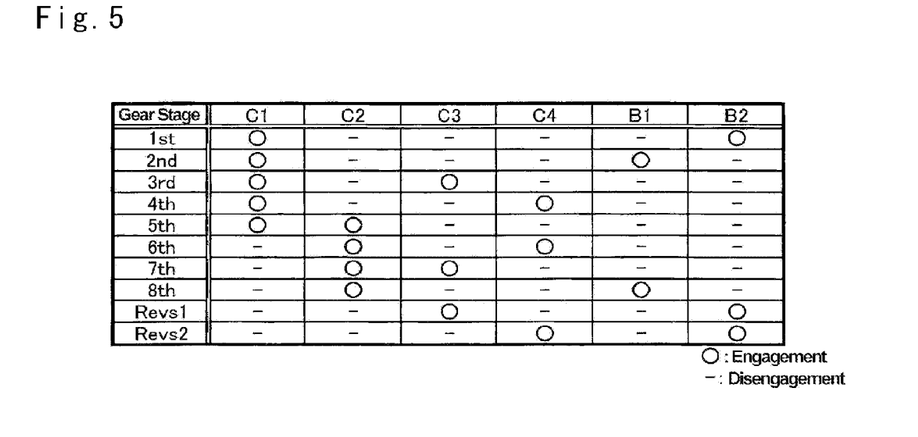
FIG. 5 is a table showing engagement states of the engagement devices under each gear stage.

Engagement states of the engagement devices under each gear stage are shown in FIG. 5. In FIG. 5, "0" represents an engagement of the engagement device, and "-" represents a disengagement of the engagement device. As indicated in FIG. 5, the first forward stage is established by bringing into engagement the first clutch C1 and the second brake B2, the second forward stage is established by bringing into engagement the first clutch C1 and the first brake B1, the third forward stage is established by bringing into engagement the first clutch C1 and the third clutch C3, the fourth forward stage is established by bringing into engagement the first clutch C1 and the fourth clutch C4, the fifth forward stage is established by bringing into engagement the first clutch C1 and the second clutch C2, the sixth forward stage is established by bringing into engagement the second clutch C2 and the fourth clutch C4, the seventh forward stage is established by bringing into engagement the second clutch C2 and the third clutch C3, and the eighth forward stage is established by bringing into engagement the second clutch C2 and the first brake B1. By contrast, the first reverse stage is established by bringing into engagement the second brake B2 and the third clutch C3, and the second reverse stage is established by bringing into engagement the second brake B2 and the fourth clutch C4.

A speed ratio of the transmission 1 is increased to be a largest ratio under the first forward speed, and reduced to be a smallest ratio under the eighth forward stage. Here, the speed ratio of the transmission 1 is set to "1" under the sixth forward stage. Accordingly, in a non-limiting illustrative example, the first forward stage corresponds to a "predetermined gear stage", the second forward stage in which a speed ratio is larger than that in the first forward stage corresponds "another gear stage", the second brake B2 serves as a "first engagement device", and the first clutch C1 serves as a "second engagement device".

Figure 6:
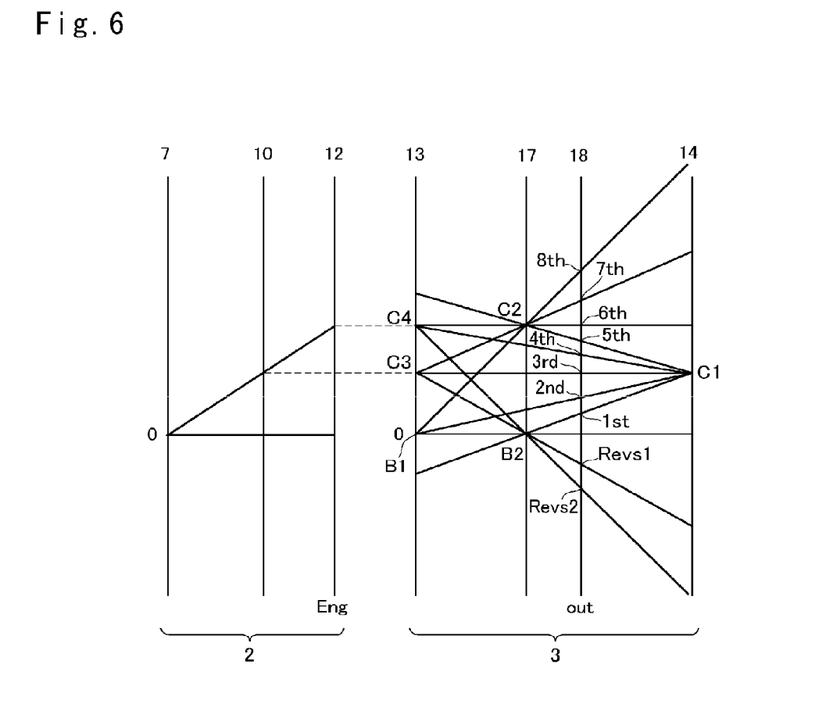
FIG. 6 is a nomographic diagram showing rotational speeds of the rotary elements of the transmission.

Turning to FIG. 6, there is shown a nomographic diagram indicating rotational speeds of the rotary members under a condition that an input speed to the transmission 1 (i.e., a rotational speed of the input shaft 11) is constant. In the following explanation, a rotational direction of the engine 4 will be called a "forward direction", a direction opposite to the rotational direction of the engine 4 will be called a "counter direction", a torque acting in a direction to reduce a rotational speed in the counter direction or to increase a rotational speed in the forward direction will be called a "positive torque", and a torque acting in a direction to reduce a rotational speed in the forward direction or to increase a rotational speed in the counter direction will be called a "negative torque". In FIG. 6, specifically, a rotational speed of each rotary member in the forward direction is indicated on each vertical line above the horizontal line representing "0", and a rotational speed of each rotary member in the counter direction is indicated on each vertical line below the horizontal line representing "0".

As described, under the first forward stage, the clutch C1 is brought into engagement so that the first ring gear 10 is connected to the third sun gear 14. In this situation, the positive torque of the engine 4 is delivered to the third sun gear 14 through the first ring gear 10. That is, the third sun gear 14 serves as an input element of the second planetary gear unit 3. Under the first forward stage, the second brake B2 is also brought into engagement so that the second carrier 17 is connected to the stationary member 6. In this situation, therefore, the rotational speed of the second carrier 17 is kept to "0" to serve as a reaction element of the second planetary gear unit 3. Consequently, the torque applied to the transmission 1 is outputted from the second ring gear 18 while being multiplied in accordance with a gear ratio of the transmission 1.

The first clutch C1 is also brought into engagement under the second forward stage. Under the second forward stage, therefore, the positive torque of the engine 4 is delivered to the third sun gear 14 through the first ring gear 10 so that the third sun gear 14 serves as the input element of the second planetary gear unit 3. In this situation, the first brake B1 is also brought into engagement to connect the second sun gear 13 to the stationary member 6 so that the rotational speed of the second sun gear 13 is kept to "0" to serve as the reaction element of the second planetary gear unit 3. Consequently, the torque applied to the transmission 1 is outputted from the second ring gear 18 while being multiplied in accordance with a gear ratio of the transmission 1.

Figure 7:
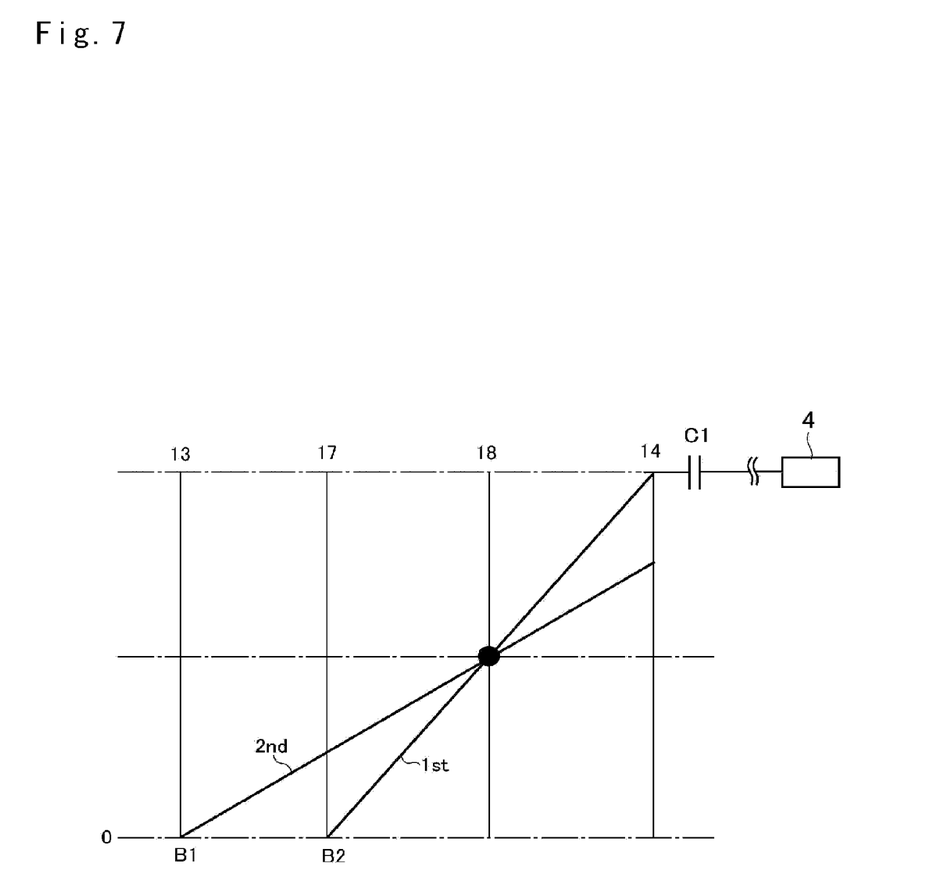
FIG. 7 is a nomographic diagram showing changes in rotational speeds of the rotary elements during shifting from the second forward stage to the first forward stage.

Turning to FIG. 7, there are shown changes in the rotational speeds of the rotary members during shifting the gear stage of the transmission 1 from the second forward stage to the first forward stage while keeping a vehicle speed constant. As can be seen from FIG. 7, the rotational speed of the third sun gear 14 is increased during shifting from the second forward stage to the first forward stage. As described, the third sun gear 14 is connected to the engine 4 through the first planetary gear unit 2 and hence the rotational speed thereof is increased by such downshifting.

By contrast, the rotational speed of the second carrier 17 is lowered to "0" and halted by bringing the second brake B2 into engagement. As described, the second brake B2 is adapted to engage the second carrier 17 with the stationary member 6 through the dog teeth. That is, when the second brake B2 is brought into engagement while rotating the second carrier 17, rotational speed of the second carrier 17 will be lowered abruptly. In order to reduce an engagement shock resulting from such an abrupt speed reduction and to reduce friction acting between the dog teeth, it is preferable to engage the second carrier 17 with the stationary member 6 after stopping the second carrier 17. However, if the second carrier 17 is brought into engagement with the stationary member 6 after being stopped, it may take time to complete the engagement of the second brake B2 and it may require an additional control to stop the second carrier 17. In order to avoid such disadvantages, according to the non-limiting illustrative example, the second brake B2 is adapted to be brought into engagement even when the second carrier 17 is rotated at a certain speed.

Figure 8:
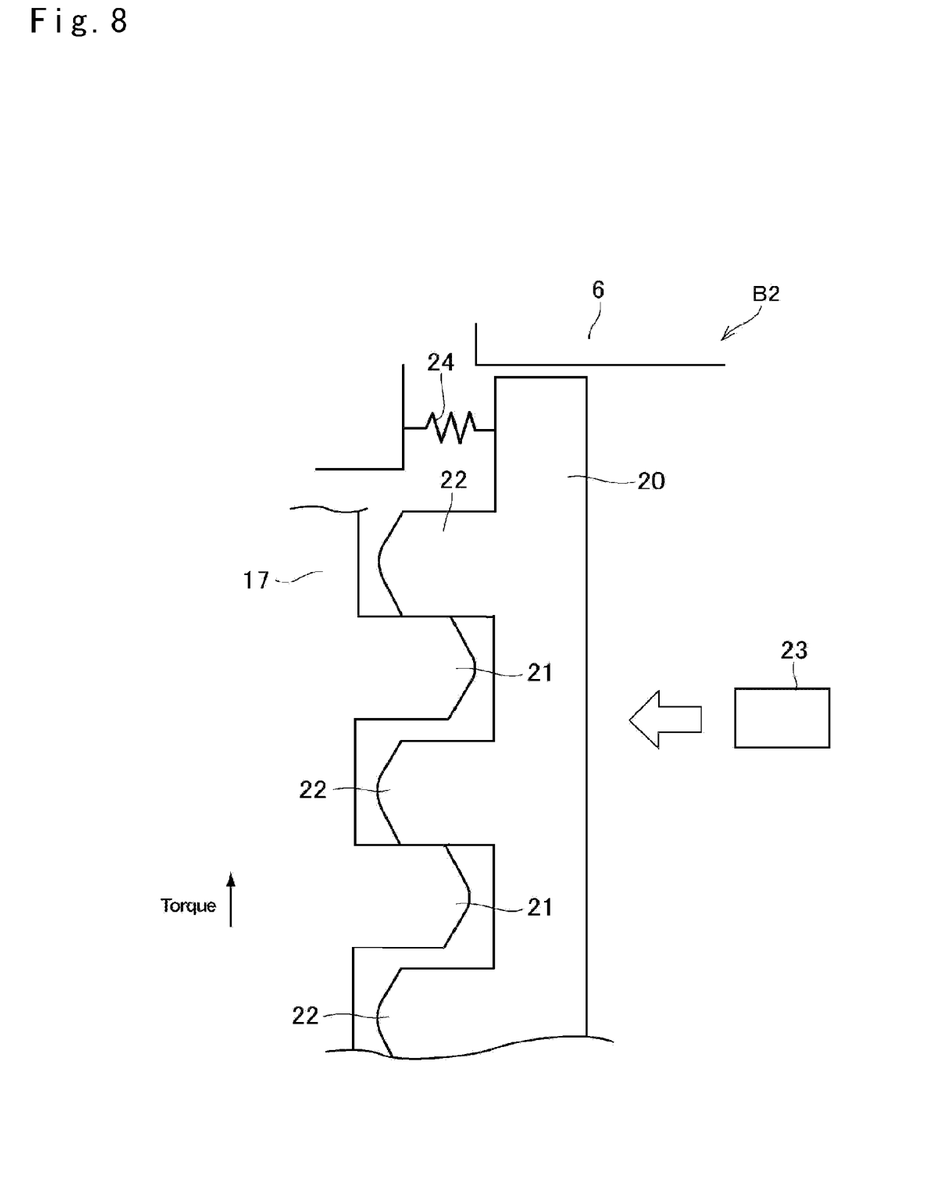
FIG. 8 is a schematic illustration showing one example of the second brake.

A structure of the second brake B2 is schematically shown in FIG. 8. As illustrated in FIG. 8, the second brake B2 is provided with an annular piston 20, and a circumferential edge thereof is splined to an inner circumferential face of the stationary member 6 so that the piston 20 is allowed to reciprocate in an axial direction while being inhibited to rotate in a circumferential direction. A plurality of first dog teeth 21 protruding in the axial direction toward the piston 20 are formed on a lateral face of the second carrier 17 at predetermined intervals in a circumferential direction. On the other hand, a plurality of second dog teeth 22 protruding toward the second carrier 17 are formed on a surface of the piston 20 at predetermined intervals in a circumferential direction to be engaged with the first dog teeth 21. Accordingly, the second carrier 17 serves as a "first member", and the stationary member 6 and the piston 20 serve as a "second member".

The piston 20 is provided with a hydraulic actuator 23 and a spring 24, and hence a hydraulic pressure of the hydraulic actuator and an elastic force of the spring 24 counteract each other across the piston 20. Specifically, the piston 20 is hydraulically pushed toward the second carrier 17 by increasing the hydraulic pressure applied to the actuator 23, and elastically isolated away from the second carrier 17 by the spring 24 by reducing the hydraulic pressure applied to the actuator 23.

As described later, a rotational direction of the second carrier 17 is switched between the forward direction and the counter direction depending on an operating condition. According to the non-limiting illustrative example, the second dog teeth 22 of the second brake B2 may be brought into engagement with the first dog teeth 21 of the second carrier 17 while rotating the second carrier 17 at certain speeds in both directions. To this end, a leading end of each tooth of the first dog teeth 21 is individually chamfered in such a manner that a width at a center thereof protrudes toward the piston 20, and a leading end of each tooth of the second dog teeth 22 is individually chamfered in such a manner that a width at a center thereof protrudes toward the second carrier 17. Therefore, when the second dog teeth 22 of the second brake B2 come into contact with the first dog teeth 21 of the rotating second carrier 17 to be engaged therewith, a chamfered face of each second dog teeth 22 is brought into contact with a chamfered face of each first dog teeth 21 in an initial phase of engagement so that the second carrier 17 is allowed to further rotate in the direction to be engaged smoothly with the piston 20 of the second brake B2. Such a chamfered face may be formed on at least one of the first dog teeth 21 and the second dog teeth 22.

During coasting of the vehicle, a rotational speed of the input shaft 11 is decreased with a reduction in a vehicle speed and eventually a downshifting of the transmission 1 will be caused. For example, given that the vehicle is coasting under the second forward stage, the rotational speed of the input shaft 11 being decreased will be raised temporarily as a result of the downshifting from the second forward stage to the first forward stage, but a rated speed of the input shaft 11 under the first forward stage with respect to a vehicle speed (as will be called the "first rated speed" hereinafter) decreases in proportion to a reduction in the vehicle speed. In this situation, when the second brake B2 is brought into engagement with the second carrier 17 before the rotational speed of the input shaft 11 is synchronized with the aforementioned first rated speed thereof, an engagement shock of the second brake B2 would be caused. In order to carry out a downshifting without causing a shift shock, the control system according to the non-limiting illustrative example is configured to carry out a control shown in FIG. 1.

Figure 1:
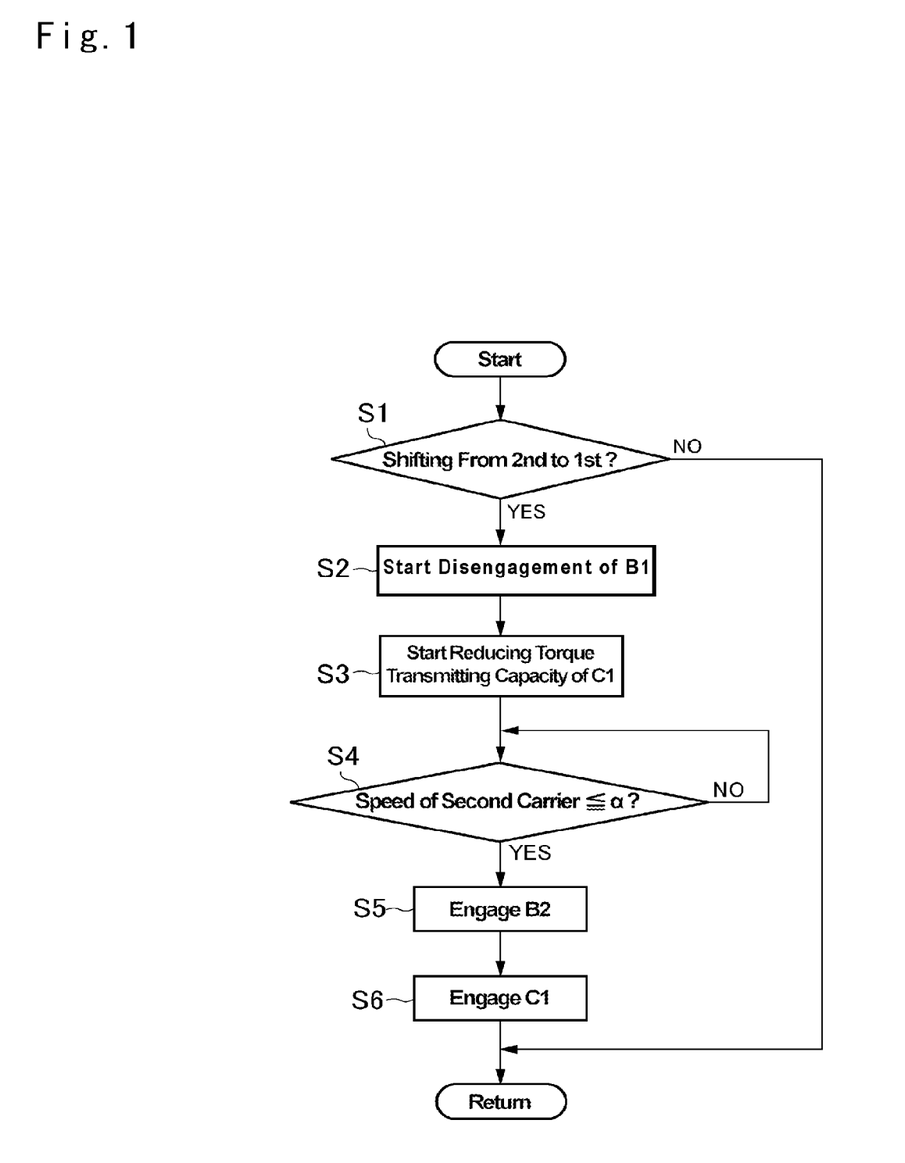
FIG. 1 is a flowchart showing one example of the control carried out by the control system according to the present application.

First of all, at step S1, it is determined whether or not a shifting from the second forward stage ($2^{nd}$) to the first forward stage ($1^{st}$) is required based on incident signals representing vehicle speed, an opening degree of accelerator, and so on to the ECU 19 with reference to a preinstalled shifting map. When the shifting from the second forward stage to the first forward stage is not required, so that the answer of step S1 is NO, the routine is returned.

By contrast, when the shifting from the second forward stage to the first forward stage is required, so that the answer of step S1 is YES, a disengagement of the first brake B1 is commenced at step S2 by gradually lowering pressure in the hydraulic actuator for actuating the first brake B1. Consequently, rotational speeds of the second sun gear 13, the second carrier 17, and the third sun gear 14 are changed in accordance with a torque transmitting capacity of the first brake B1 and an output torque of the engine 4.

Then, at step S3, a reduction in a torque transmitting capacity of the first clutch C1 is commenced to reduce an inertia torque of the second carrier 17 resulting from bringing the second brake B2 into engagement while maintaining engagement of the first clutch C1 in the transmission 1. Consequently, the torque transmitting capacity of the first clutch C1 is reduced to an extent that the transmission 1 is substantially brought into a neutral state. As described later, the first clutch C1 will be brought into complete engagement again at a subsequent step. To this end, during the reducing the torque transmitting capacity of the first clutch C1, it is preferable to keep delivering oil to the hydraulic actuator of the first clutch C1 in such a manner that torque transmitting faces thereof are slightly in contact with each other. In addition, in order to reduce the speed of the second carrier 17, it is further preferable to carry out steps S2 and S3 cooperatively in accordance with the torque applied to the transmission 1 from the drive wheels during decelerating the vehicle, and an output torque of the engine 4. Here, it is to be noted that an order of carrying out steps S2 and S3 may be switched, and that steps S2 and S3 may also be carried out simultaneously.

As a result of the bringing the first brake B1 into disengagement while reducing torque transmitting capacity of the first clutch C1, an engagement of the second brake B2 can be carried out while bringing the transmission 1 into the neutral state. In this situation, when the second carrier 17 is rotated at a high speed, the dog teeth 21 and 22 may repel each other or be damaged by the inertia torque of the second carrier 17 when bringing the second brake B2 into engagement. In order to avoid such disadvantages, at step S4, it is determined whether or not the rotational speed of the second carrier 17 is equal to or slower than a reference speed $\alpha$ to carry out the engagement of the second brake B2. To this end, the reference speed $\alpha$ is determined based on a total mass of the second carrier 17 and members rotated integrally therewith, strengths of the dog teeth 21 and 22, and so on.

When the rotational speed of the second carrier 17 is higher than the reference speed $\alpha$, so that the answer of step S4 is NO, the determination of step S4 is repeated until the rotational speed of the second carrier 17 is reduced to be lower than the reference speed $\alpha$. By contrast, when the rotational speed of the second carrier 17 is lower than the reference speed $\alpha$, so that the answer of step S4 is YES, the routine advances to step S5 to bring the second brake B2 into engagement by increasing the pressure in the hydraulic actuator of the second brake B2. Optionally, the second dog teeth 22 of the piston 20 may be brought close to the first dog teeth 21 of the second carrier 17 in advance by delivering oil to the actuator of the second brake B2.

After the bringing the second brake B2 into engagement, the torque transmitting capacity of the first clutch C1 is increased again at step S6 to a level not to cause a slip, and the routine is returned. To this end, it is preferable to increase the torque transmitting capacity of the first clutch C1 smoothly at a rate not to change an output torque of the transmission 1 abruptly.

Figure 2:
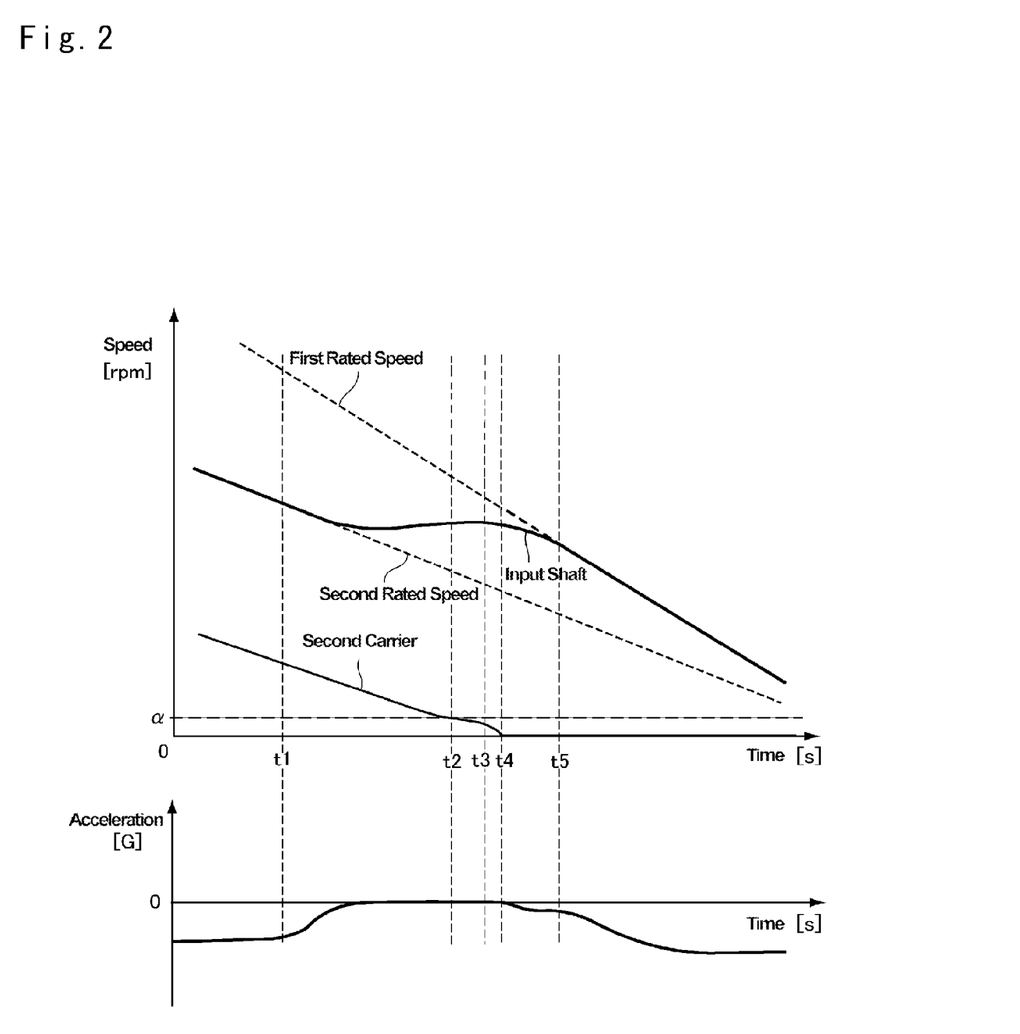
FIG. 2 is a time chart showing changes in rotational speeds of the input shaft, the second carrier, and acceleration of the vehicle during execution of the control shown in FIG. 1 under a condition that engine torque is relatively small.

Changes in rotational speeds of the input shaft 11 and the second carrier 17, and acceleration of the vehicle during execution of the control shown in FIG. 1 are shown FIG. 2. In the situation shown in FIG. 2, the output torque of the engine 4 is kept to a relatively low level to keep the speed of the input shaft 11 to a constant level during reducing the torque transmitting capacity of the first clutch C1 while bringing the first brake B1 into disengagement.

In the beginning of the situation shown in FIG. 2, the vehicle coasts under the second forward stage at a constant deceleration rate, and rotational speed of the input shaft 11 is lowered until point t1 in accordance with the speed ratio of the second forward stage and a current vehicle speed. In this situation, both the first brake B1 and the first clutch C1 are brought into engagement and hence rotational speeds of the second carrier 17 and the third sun gear 14 are lowered.

When the requirements to shift the gear stage from the second forward stage to the first forward stage is satisfied at point t1 so that the routine shown in FIG. 1 advances from step S1 to step S2, reduction of torque transmitting capacity of the first clutch C1 and disengagement of the first brake B1 are commenced. As shown in FIG. 2, a second rated speed of the input shaft 11 under the second forward stage with respect to a vehicle speed also decreases in proportion to a reduction in the vehicle speed, but the rotational speed of the input shaft 11 temporarily stays at a substantially constant level during execution of downshifting. Eventually the vehicle speed is further reduced, and the rotational speed of the second carrier 17 is further lowered in accordance with such reduction in the vehicle speed and a speed ratio of the second planetary gear unit 3. In this situation, the first brake B1 is causing a slip and hence the torque transmitting capacity thereof is reduced. Meanwhile, the first clutch C1 is maintained in a level of engagement.

When the rotational speed of the second carrier 17 falls below the reference speed α at point t2 so that the routine advances from step S4 to step S5, the second brake B2 is brought into engagement. In this situation, the rotational speed of the second carrier 17 keeps falling until the second dog teeth 22 of the piston 20 come into contact with the first dog teeth 21 of the second carrier 17.

Eventually, the second dog teeth 22 of the piston 20 come into contact with the first dog teeth 21 of the second carrier 17 at point t3, and the second carrier 17 is fully brought into engagement with the second brake B2 while being rotated along the chamfered faces formed on the leading ends of the dog teeth 21 and 22. Consequently, the second carrier 17 comes to a stop and the first clutch C1 starts causing slip. In this situation, a rotational speed of the third sun gear 14 is raised from point t3, and since the first clutch C1 is thus causing slip, the rotational speed of the input shaft 11 is maintained at a substantially constant level. That is, a rotational speed of the engine 4 is maintained at a substantially constant level. In this situation, therefore, an inertia torque resulting from change in the rotational speed of the engine 4 will not be generated, and an inertia torque resulting from changes in the rotational speeds of the third sun gear 14 and so on is absorbed by the slipping first clutch C1 on the way to the driving wheels. For these reasons, acceleration of the vehicle is not changed even during execution of the downshifting so that an engagement shock of the second brake B2 can be reduced. Here, in FIG. 2, the broken line branching off from the solid line indicating the rotational speed of the input shaft 11 at point t3 indicates a rotational speed of the input shaft 11 in a case in which the first clutch C1 is in complete engagement after point t3.

Then, when the second brake B2 is brought into complete engagement at point t4, the second carrier 17 is continuously halted and the torque transmitting capacity of the first clutch C1 is increased gradually. Consequently, the rotational speed of the input shaft 11 is gradually raised to the first rated speed so that an engagement shock of the first clutch C1 may also be reduced. After the input shaft 11 and the third sun gear 14 start rotating integrally at point t5, the torque transmitting capacity of the first clutch C1 is increased stepwise to a level at which the first clutch C1 is allowed to rotate without causing slip.

Next, changes in rotational speeds of the input shaft 11 and the second carrier 17, and acceleration of the vehicle in a case in which an output torque of the engine 4 during execution of downshifting is relatively large will be explained with reference to FIG. 3. Specifically, FIG. 3 shows changes in rotational speeds of the input shaft 11 and the second carrier 17, and acceleration of the vehicle in a case in which the rotational speed of the input shaft 11 is increased under conditions that the first brake B1 is brought into disengagement and the torque transmitting capacity of the first clutch C1 is reduced.

Figure 3:
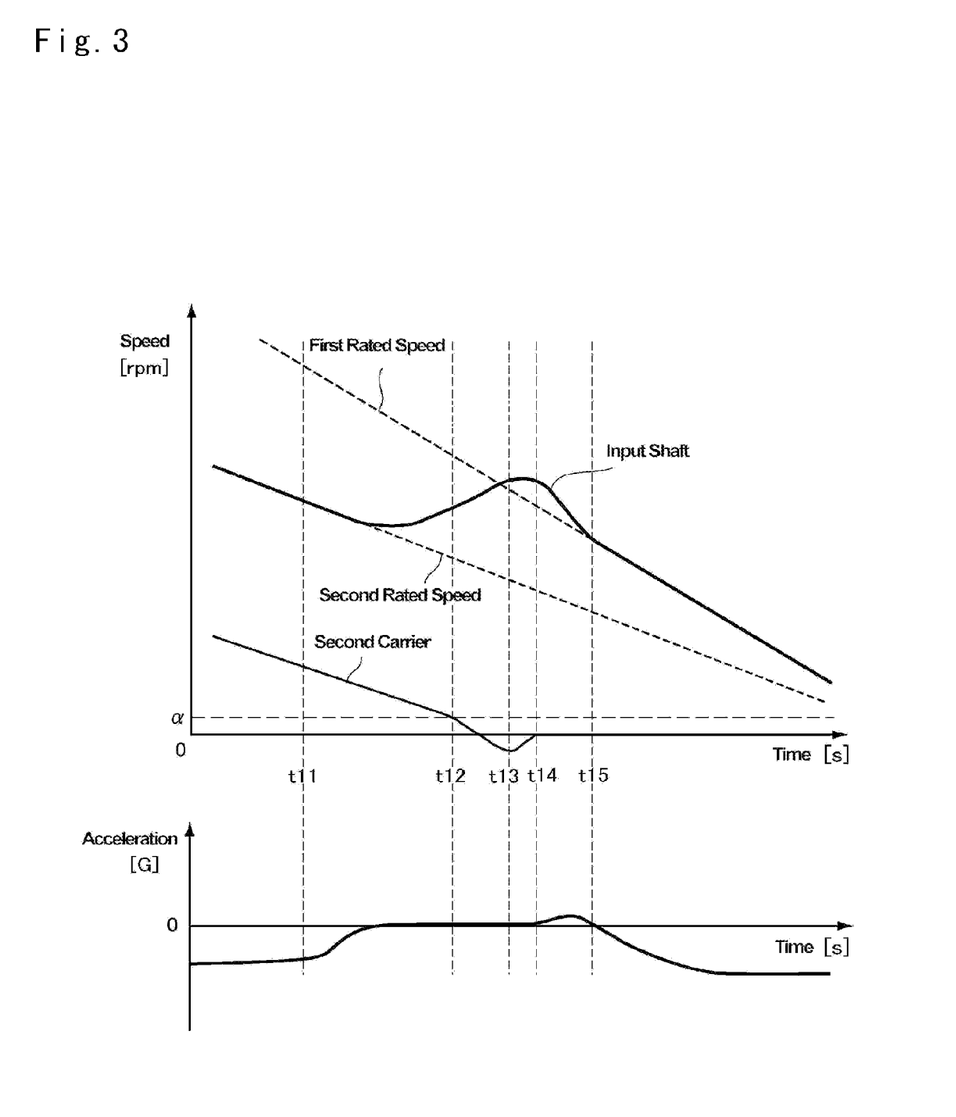
FIG. 3 is a time chart showing changes in rotational speeds of the input shaft, the second carrier, and acceleration of the vehicle during execution of the control shown in FIG. 1 under a condition that engine torque is relatively large.

In the beginning of the situation shown in FIG. 3, the vehicle also coasts under the second forward stage at a constant deceleration rate, and rotational speed of the input shaft 11 is lowered until point t11 in accordance with the speed ratio of the second forward stage and a current vehicle speed. In this situation, both the first brake B1 and the first clutch C1 are also brought into engagement and hence rotational speeds of the second carrier 17 and the third sun gear 14 are lowered.

When the requirements to shift the gear stage from the second forward stage to the first forward stage is satisfied at point t11 so that the routine shown in FIG. 1 advances from step S1 to step S2, reduction of torque transmitting capacity of the first clutch C1 and disengagement of the first brake B1 are commenced. As shown in FIG. 3, a second rated speed of the input shaft 11 under the second forward stage with respect to a vehicle speed also decreases in proportion to a reduction in the vehicle speed, but the rotational speed of the input shaft 11 is increased during execution of downshifting. Eventually the vehicle speed is further reduced, and the rotational speed of the second carrier 17 is further lowered in accordance with such reduction in the vehicle speed and a speed ratio of the second planetary gear unit 3. In this situation, the first brake B1 is causing a slip and hence the torque transmitting capacity thereof is reduced. Meanwhile, the first clutch C1 is maintained in a level of engagement.

When the rotational speed of the second carrier 17 falls below the reference speed α at point t12 so that the routine advances from step S4 to step S5, the second brake B2 is brought into engagement. In this situation, the rotational speed of the second carrier 17 keeps falling until the second dog teeth 22 of the piston 20 come into contact with the first dog teeth 21 of the second carrier 17. In the situation shown in FIG. 3, however, the engine 4 generates a relatively large torque and hence the rotational speed of the input shaft 11 is temporarily raised to be higher than the first rated speed. Consequently, a rotational direction of the second carrier 17 is temporarily reversed.

Eventually, the second dog teeth 22 of the piston 20 come into contact with the first dog teeth 21 of the second carrier 17 at point t13, and the second carrier 17 is fully brought into engagement with the second brake B2 while being rotated along the chamfered faces formed on the leading ends of the dog teeth 21 and 22. Consequently, the second carrier 17 comes to a stop and the first clutch C1 starts causing slip. In this situation, a rotational speed of the third sun gear 14 is lowered from point t13, and since the first clutch C1 is thus causing slip, an engagement shock of the second brake B2 is absorbed by the slipping first clutch C1 on the way to the driving wheels. For this reason, acceleration of the vehicle is not changed significantly even during execution of the downshifting so that an engagement shock of the second brake B2 can be reduced. In this situation, since the torque transmitting capacity of the first clutch C1 is reduced, a rotational speed the input shaft 11 is continuously increasing.

Then, when the second brake B2 is brought into complete engagement at point t14, the second carrier 17 is continuously halted and the torque transmitting capacity of the first clutch C1 is increased gradually. Consequently, the rotational speed of the input shaft 11 is gradually reduced to the first rated speed so that an engagement shock of the first clutch C1 may also be reduced. After the input shaft 11 and the third sun gear 14 start rotating integrally at point t15, the torque transmitting capacity of the first clutch C1 is increased stepwise to a level at which the first clutch C1 is allowed to rotate without causing slip.

Thus, when the second brake B2 is brought into engagement, fluctuation of torque resulting from changes in speed of the rotary members can be reduced by temporarily reducing the torque transmitting capacity of the first clutch C1. That is, acceleration of the vehicle will not be changed abruptly and hence an engagement shock of the second brake B2 can be reduced. In other words, engagement of the second brake B2 can be started before the rotational speed of the second carrier 17 is reduced to "0" so that a shifting time from the second forward stage to the first forward stage can be shortened. In addition, when the second brake B2 is brought into engagement, the first clutch C1 can be slipped to reduce engagement load and friction acting between the dog teeth 21 and 22. For this reason, hydraulic pressure required to bring the second brake B2 into engagement can be reduced and hence power loss can be reduced.

The control system according to the non-limiting illustrative example may also be configured to carry out the foregoing controls when shifting the gear stage of the transmission 1 from the third or fourth forward stage to the first forward stage. In addition, the control system according to the non-limiting illustrative example may also be configured to carry out the foregoing controls during execution of upshifting.

Although the above exemplary embodiments of the present application have been described, it will be understood by those skilled in the art that the present application should not be limited to the described exemplary embodiments, and various changes and modifications can be made within the spirit and scope of the present application. For example, a clutch device may also be used as the first engagement device instead of the second brake B2.

What is claimed is:

1. A control system for a transmission comprising:
   a first engagement device that brings first dog teeth of a first member into engagement with second dog teeth of a second member to enable torque transmission therebetween;
   a second engagement device that connects a third member and a fourth member while changing a torque transmitting capacity therebetween; and
   a controller, wherein
   the transmission establishes a predetermined gear stage by bringing into engagement the first engagement device and the second engagement device, and
   the controller is configured to bring the first engagement device into engagement while reducing a torque transmitting capacity of the second engagement device and then to increase the torque transmitting capacity of the second engagement device, when shifting a gear stage from another gear stage established by bringing the first engagement device into disengagement while bringing the second engagement device into engagement to said predetermined gear stage.

2. The control system for a transmission as claimed in claim 1, wherein the controller is further configured to reduce the torque transmitting capacity of the second engagement device to a predetermined level at which a relative rotation between the third member and the fourth member is achieved when shifting the gear stage from said another gear stage to said predetermined gear stage.

3. The control system for a transmission as claimed in claim 2, wherein the controller is further configured to bring the first dog teeth into engagement with the second dog teeth after reducing the torque transmitting capacity of the second engagement device to the predetermined level.

4. The control system for a transmission as claimed in claim 1, wherein the controller is further configured to gradually increase the torque transmitting capacity of the second engagement device after bringing the first engagement device into engagement.

5. The control system for a transmission as claimed in claim 1, wherein at least one of the first dog teeth and the second dog teeth includes a chamfered leading end to allow the first member to rotate in a direction to be engaged smoothly with the second member when the second dog teeth come into contact with the first dog teeth in an initial phase of engagement.

6. The control system for a transmission as claimed in claim 1,
   wherein a gear ratio of said predetermined gear stage is larger than that of said another gear stage, and
   wherein the controller is further configured to shift the gear stage from said another gear stage to said predetermined gear stage when an input speed of the transmission is reduced.

7. The control system for a transmission as claimed in claim 1,
   wherein a gear ratio of said predetermined gear stage is smaller than that of said another gear stage, and
   wherein the controller is further configured to shift the gear stage from said another gear stage to said predetermined gear stage when an input speed of the transmission is increased.

* * * * *